March 17, 1959  T. E. SHOUP ET AL  2,878,363
WELDING STUD AND FERRULE ARRANGEMENT
Filed April 26, 1956
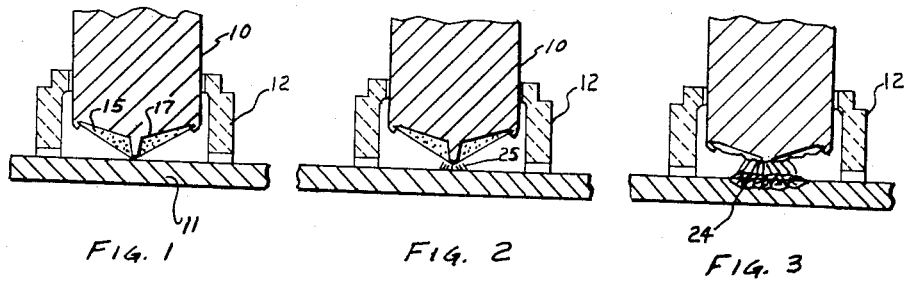
FIG. 1   FIG. 2   FIG. 3
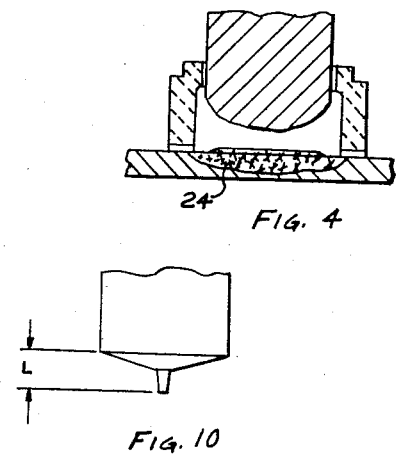
FIG. 4
FIG. 10
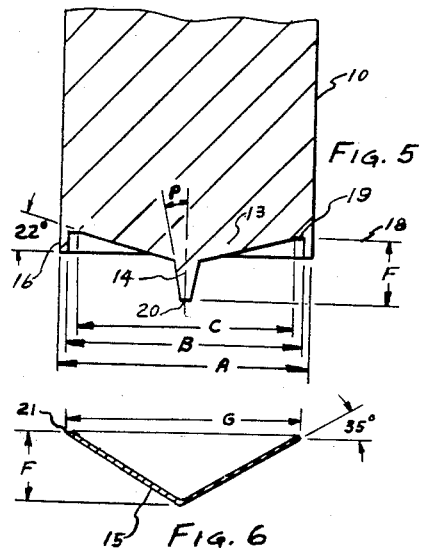
FIG. 5
FIG. 6
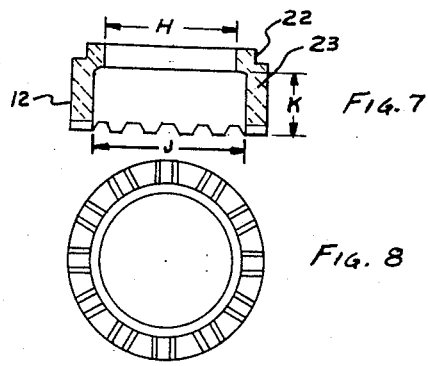
FIG. 7
FIG. 8
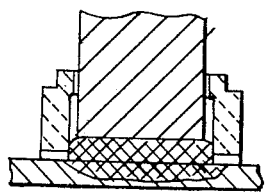
FIG. 9
INVENTOR.
BY

United States Patent Office 2,878,363
Patented Mar. 17, 1959

2,878,363
WELDING STUD AND FERRULE ARRANGEMENT

Thomas E. Shoup, Amherst, and Lorenz J. Mowry, Elyria, Ohio, assignors to Gregory Industries, Inc., Detroit, Mich., a corporation of Michigan Application April 26, 1956, Serial No. 580,827

8 Claims. (Cl. 219—99)

This invention relates to end arc welding studs and ferrules and in particular to a combination of a stud and ferrule having dimensions and proportions which make it possible to end arc weld studs of large diameter while obtaining a quality weld with a minimum amount of welding current.

In the past, studs and ferrules have been used wherein the welding end of the stud was somewhat cone shaped and covered with a cap which retained flux between the cap and the end of the stud and the ferrule had a neck slidable over the stud and a cavity providing a recess around the welding end of the stud. Studs and ferrules of this type are commonly used in industry and are illustrated in Nelson Patent Nos. 2,268,416-Re. 22,411, 2,355,099, 2,402,659, and 2,416,204. These studs have been very successful in smaller diameters up to 5/8" or 3/4". However, many problems have arisen when attempts were made to weld studs of larger diameter of 7/8", 1 1/8", 1 1/4" and up. In attempting to weld these larger diameter studs it was found that control of the welding arc, length of the welding arc, the pattern of melting the end of the stud, space for gases formed by the arc while providing a ferrule to prevent contamination of the arc and to contain the molten metal, are all important variables. Control of the arc is important since best quality welds are obtained if the arc is maintained in the center of the stud and plate and ferrule. This provides even melting on the end of the studs.

This control of the arc makes possible the use of a constant gun lift for all stud diameters. The arc length is, in effect, built into the stud itself by reason of this control by physical formation. Heretofore, it was necessary to change the stud lift and increase such lift as the stud diameter increased. For example: Studs up through 1/2 inch require a 1/16 inch lift; studs from 5/8 inch through 3/4 inch require a 3/32 inch lift; those studs of 7/8 inch through 1 inch require a 1/8 inch lift. Elimination of such variation in lift, it will readily be appreciated, is a desirable result in and of itself.

This invention provides means for obtaining even melting of the welding end to obtain a smooth curvature, or modified hemi-spherical shaped melting of the end of the stud.

If the end of the stud is melted to a modified hemi-spherical shape and the crater of the plate is also melted to similar shape, the stud will seat properly in the crater and the molten material will form a strengthening fillet around the stud at the site of the weld.

When the welding arc is not controlled and is allowed to wander to one side or edge of the stud, neither an even burn-off nor a good crater is obtained. The result is that an unsatisfactory weld is obtained. The present invention provides means to control the arc so that proper burn-off or melting pattern is obtained.

In conventional practice, a ceramic ferrule is used to shield the arc and mold the molten metal pool into a clean and even fillet. The ferrule plays an important part in controlling the arc as well as protecting the weld metal and forming a fillet. The ferrule enclosing the welding arc retains heat, excludes atmosphere and prevents wind currents from moving the arc or contaminating the weld metal. However, when the arc is burning gases are formed from the combustible impurities at the weld site. These gases must be allowed to dissipate and there must be sufficient cavity room within the ferrule for gas to form without building up too much pressure. Also the ferrule must allow proper melting of the peripheral portions of the welding end of the stud. These various points were not apparent or are relatively unimportant in the end arc welding of smaller diameter studs. However, with the larger diameter studs it has been found that best quality welds are obtained if the hereinafter described stud and ferrule combination which overcomes these deficiencies is used.

In accordance with the present invention the welding end is provided with cooperating truncated cone portions and the ferrule with a cavity wherein the dimensions of the cone portions and cavity have a definite relationship to the diameter of the welding end of the stud. It has been found that studs and ferrules with these dimensional relationships ensure better stabilization of the welding arc and an evenly curved burn-off whereby the end of the stud is a modified hemi-spherical shape just prior to plunging of the stud into the crater.

This combination also permits the obtaining of good quality welds with lower weld currents than can be obtained if the correct combination is not used. The power supply can be important especially when the large diameter studs require over 2,000 amperes at a 40 volt arc for a period of a second and a half. Such power is not obtainable from condenser discharge or other similar equipment and must come from heavy duty power sources. By using the present combination of stud and ferrule the current consumed may be as much as 20% less than that required to obtain a lower quality weld with studs and ferrules designed like the prior studs and ferrules.

Therefore one of the objects of the invention is to provide a stud and ferrule combination which will provide quality welds when a large diameter stud is end arc welded to a plate.

Another object of the invention is to provide a large diameter stud and ferrule combination which helps control the location and length of the welding arc and which provides a good melting pattern of the stud and the plate to which it is being welded.

A further object of the invention is to provide a large diameter stud with a welding end comprising truncated cone portions and a ferrule of such a size that it cooperates with the truncated cone portions and the remainder of the welding end of the stud to provide best quality welds with the least amount of welding current.

Other objects and a fuller understanding of the invention will become apparent from the description and claims and the drawings in which:

Figure 1 is a view, partly in cross section, of a stud and ferrule in position to weld the stud to a plate and just before the flow of any welding current.

Figure 2 is a view similar to Figure 1 but immediately after welding current has initiated an arc.

Figure 3 is a view, partly in a cross section of the stud, ferrule and plate showing the location of the welding arc after the smaller truncated cone portion has been melted.

Figure 4 is a cross sectional view of the stud and ferrule showing the general burn-off pattern and the shape of the end of the stud and the crater, with the crater filled with molten weld metal, just prior to seating of the stud into the crater.

Figure 5 is an enlarged cross sectional view of the stud and truncated cone portions.

Figure 6 is an enlarged cross sectional view of the cap which covers the cone portions to retain the welding flux.

Figure 7 is a cross sectional view of the ferrule.

Figure 8 is a bottom view of the ferrule illustrated in Figure 7.

Figure 9 is a cross sectional view of a completed weld showing the fillet formation aiding and strengthening the weld, along with the position of the welding end in the crater, and Figure 10 illustrates a modification of the invention.

The stud and ferrule combination illustrated and described herein can be used with any standard stud welding equipment having a current capacity to handle them. Such equipment is not illustrated and described since it is in commercial use. Figure 1 illustrates a stud and ferrule combination in position for welding. The stud has a welding end 10 seated against a plate 11 and positioned within a ferrule 12.

To better understand the description and operation of the parts, the welding end of the stud and ferrule are described separately and the operation of the assembly is described later.

Welding end of stud

The welding end 10 of the stud may be constructed from any current conducting weldable material even though weldable steel is the material most commonly used in industry. The welding end 10 has a large truncated cone portion 13, a smaller truncated cone portion 14, and a somewhat cone shaped cap 15 secured thereto by a peripheral wall portion 16. The cap 15 covers the truncated cone portions 13 and 14 and forms therewith a flux chamber containing welding flux 17.

In Figure 5 the stud blank is illustrated prior to securing the cap thereto. The welding end 10 has a weld base outside diameter A, illustrated by the dimension lines, at the plane 18 of the base of the larger truncated cone 13. This base plane is indicated as falling on dimension line 18. The peripheral wall portion 16 extends from this base plane 18 and has an inside diameter B.

The larger truncated cone portion 13 has a base diameter C located on the base line 18. Since the diameter C is less than the diameter B the stud has an annular bottom surface 19 on the base plane around the larger cone portion 13 and within the peripheral wall 16. The cone portions, peripheral wall portion and bottom surface are concentric. The larger truncated cone portion 13 also has a base angle of preferably 22°.

The smaller truncated cone portion 14 merges with the larger truncated cone portion 13 at a distance from the base plane 18 and is integrally joined concentric therewith. This smaller truncated cone portion 14 terminates at its apex end in a small flat surface 20. The smaller truncated cone portion has an apex angle of twice P, where P is the angle between the axis and surface of the portion. For purposes of clarity in description the sum of the height of both cones is shown by the character F.

The cap 15 is constructed of a material which will join with the material from which welding end 10 is made when welding takes places. Cap 15 has a base diameter G, an inside height F' and a base angle of preferably 35°. The cap is illustrated in cross section in Figure 6. When the welding end 10 is completed the periphery 21 of the base of cap 15 seats against annular bottom surface 19 and the apex end surface 20 of truncated cone portion 14 seats against the inside surface at the apex of cap 15. The peripheral wall portion 16 is crimped inwardly over the peripheral edge 21 of the cap as illustrated in Figures 1–4 inclusive to secure the cap to the welding end of the stud with the cap enclosing the truncated cone portions. The cap 15 and the truncated cone portions thus provide a flux chamber within cap 15 and around the truncated cone portions to hold the flux 17.

Ferrule

The ferrule 12 is illustrated with its important dimensions in Figures 7 and 8. Although in appearance it is quite similar to prior ferrules, its dimensions are related to the welding end 10 in such a way it cooperates with welding end 10 as will be later described. Ferrule 12 has a neck portion on one end thereof with an inside diameter H and a cavity forming wall portion 23 extending from the neck portion. The cavity wall forming portion 23 has an inside diameter J and an axial length or cavity height K.

Dimensional relationships

As was previously pointed out it has been found that large diameter studs are end welded to plates with good quality welds if the welding end of the stud and the ferrule are cooperatively dimensioned. The relationships of these dimensions are based on the following formulas and all dimensions should be within manufacturing tolerances of those calculated dimensions to obtain best results and good welds with a minimum of current, weld splatter etc. All dimensions are given in inches.

$B = A - .062$
$C = A - .156$
$F = .35A - .046$
$G = A - .104$
$P = $ max. 45°, min. 15°
$H = 1.025A$
$J = XA$, where $X$ may vary from 1.20 to 1.30
$K = Z(.35A - .033)$ where $Z$ may vary from 1.40 to 1.60

With these dimensions it has been found the optimum welds of large diameter studs having characteristics desired will be obtained.

Welding of stud

In welding the stud to the plate, welding end 10 is placed against plate 11 and in ferrule 12 (see Figure 1). Next the stud is withdrawn from plate 11 simultaneously with passing current through the stud and plate to initiate an arc 25 (see Figure 2). Prior to this time the stud had to be lifted several times further from the plate to obtain a welding arc, however, with the present arrangement the stud is lifted only a distance approximately equal to the difference between dimensions A and B.

In Figure 2 the welding arc 25 is initiated and extends coaxially of the stud from the apex point of cap 15 to the adjacent point on plate 11. Welding current passing through the arc quickly melts the cap and the arc consumes or melts the small truncated cone 14 and its surrounding flux 17 as well as starting a crater in plate 11. The arc remains in the center of the ferrule and increases rapidly in length until it begins to melt the larger truncated cone portion 13. (See Figure 3.) By this time the cap and most of the flux is consumed and the arc is melting the truncated cone portion 13 and peripheral wall 16 as well as forming a crater 24 in the plate 11. The welding arc is maintained in the center of the welding end and melts the welding end into a curved or modified hemi-spherical shape and the crater into a similar shape as illustrated in Figure 4. The dimensions of the ferrule permit it to cooperate with and not deter the arc so that a good melting pattern is obtained.

The ferrule permits the heat of the arc to melt the periphery of the stud and at the same time the ferrule helps prevent air currents from moving the arc out of the stud axis or to one side of the stud. The ferrule cavity is of the correct size to handle gases formed by the arc and also to retain the molten metal. All melting of the end of the stud takes place in the ferrule cavity.

When the welding end is seated in the crater the molten material securely welds the stud to the plate to provide a good quality weld.

Figure 9 illustrates in cross section the weld obtainable with studs and ferrules made in accordance with the present invention. The end of the stud has been melted properly and in a modified hemi-spherical pattern similar to the melting pattern of the crater. Also the ferrule has retained the molten material and formed it into a fillet completely joining the stud and plate by a strong weld.

A modification is illustrated in Figure 10 wherein the stud is metalized instead of having granular flux and a cap. As is illustrated, the truncated cone portions are dimensioned the same as the stud of Figure 5. However, since the wall has been omitted, the dimension has been omitted. The larger cone portion extends to the outside of the stud whereby its base diameter coincides with the stud diameter. The dimension L has been added to provide the length of both cone portions. $L=.35A-.014$.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. A stud and ferrule assembly comprising a stud having a welding end of diameter A to be end arc welded to a plate, a ferrule encircling said stud to assist in the end arc welding of the stud to the plate, said welding end having a first somewhat truncated cone portion of base diameter C and a second somewhat truncated cone portion integrally joined to the apex end of the first cone portion and extending co-axially outwardly therefrom, a somewhat cone shaped cap having an inside height approximately equal to the sum of the axial lengths of said cone portions and said cap having a base angle of 35°, said welding end having a peripheral wall extending from the plane of the base of the first truncated cone portion beyond the peripheral base edge of the cap and holding the apex of the cap against the apex end of the second cone portion, welding flux in said cap and around said cone portions, said ferrule having a neck portion on one end thereof of inside diameter 1.025 times the diameter of the stud with the neck portion encircling the stud, said ferrule having a cavity in the other end thereof of inside diameter between 1.20 and 1.30 times the stud diameter and an axial length equal to 1.40 to 1.60 times $(.35A-.033)$.

2. A stud and ferrule combination for end arc welding a stud to a plate, said stud having a weld base outside diameter A, a composite end of a first truncated cone base with a smaller angle point extending therefrom, said first truncated cone portion having a base angle of approximately 22°, said smaller angle point being a second truncated cone portion with an apex angle P, a cap covering said cone portions and having a base diameter G and a base angle of 35° and an inside height F, said ferrule having a neck end with an inside diameter J and an inside length K, said diameters and lengths having approximately the following proportions when all of the diameters and lengths are measured in inches; $C=A-.156$, $G=A-.104$; $H=1.025A$; $J=XA$ where X is in the range between 1.20 and 1.30, $K=Z(.35A-.033)$ where Z is in the range between 1.40 and 1.60; and P is in the range between 15° and 45°, as set forth in the drawing.

3. A stud for end arc welding to a plate, said stud having a welding end, said welding end having integrally joined first and second truncated cone portions, said first cone portion having a base angle of about 22° and said second cone portion having an apex angle of between 30° and 90°, said portions being axially extensive with each other with the base of the second cone portion joining the apex of the first cone portion, a cap enclosing said cone portions and having a base in the plane of the base of the first cone portion and an apex engaging the second cone, said cap and said cone portions providing a flux receiving space internally of the cap and around the cone portions.

4. A stud and ferrule for welding, as illustrated and dimensioned in Figures 5, 6, and 7 and having dimensions substantially within the following dimensions, as measured in inches:

$A=$ diameter of stud
$B=A-.062$
$C=A-.156$
$F=.35A-.046$
$G=A-.104$
$P=45°$ max., 15° min.
$H=1.025\ A$
$J=XA$, where X may vary from 1.20 to 1.30
$K=Z(.35A-.033)$, where Z may vary from 1.40 to 1.60

5. A stud and ferrule as illustrated and dimensioned in Figures 7 and 10 and having dimensions substantially within the following dimensions, as measured in inches:

$A=$ diameter of stud
$P=45°$ max., 15° min.
$H=1.025A$
$J=XA$, where X may vary from 1.20 to 1.30
$K=ZA$, where Z may vary from 1.40 to 1.60
$L=.35A-.014$ 6. A welding stud dimensioned in inches in accordance with Figure 5 wherein:

$A=$ stud diameter
$B=A-.062$
$C=A-.156$
$P=15°$ to $45°$

7. A welding stud dimensioned in inches in accordance with Figure 10 wherein:

$A=$ stud diameter
$P=15°$ to $45°$
$L=.35A-.014$

8. A stud for arc welding to a metal plate comprising, an elongated metal body having a weld end, said weld end comprising first and second coaxially aligned truncated cone portions, the first truncated cone portion having a blunt end and a rather high length-to-width ratio, the second truncated cone portion being interposed between the first truncated cone portion and the remainder of the body, the second truncated cone portion having a relatively low length-to-width ratio, and the truncated cone portions being immediately adjacent one another such that the second is a continuation of the first.

References Cited in the file of this patent

UNITED STATES PATENTS

| | | |
|---|---|---|
| 1,004,795 | Lachman | Oct. 3, 1911 |
| 2,402,659 | Nelson | June 25, 1946 |
| 2,416,204 | Nelson | Feb. 18, 1947 |
| 2,455,244 | Evans | Nov. 30, 1948 |
| 2,459,957 | Palmer | Jan. 25, 1949 |
| 2,493,283 | Evans | Jan. 3, 1950 |
| 2,760,797 | Woodling | Aug. 28, 1956 |

FOREIGN PATENTS

| | | |
|---|---|---|
| 515,052 | Canada | July 26, 1955 |
| 663,178 | Great Britain | Dec. 19, 1951 |
| 715,259 | Great Britain | Sept. 8, 1954 |
| 1,059,383 | France | Nov. 10, 1953 |